(12) United States Patent
Kim et al.

(10) Patent No.: US 12,728,765 B2
(45) Date of Patent: Sep. 8, 2026

(54) VEHICLE BATTERY OVERCHARGING PREVENTION SYSTEM AND METHOD

(71) Applicant: LG ENERGY SOLUTION, LTD., Seoul (KR)

(72) Inventors: Woo Yeol Kim, Daejeon (KR); Jong Woo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 846 days.

(21) Appl. No.: 18/021,104

(22) PCT Filed: Oct. 12, 2021

(86) PCT No.: PCT/KR2021/014040
§ 371 (c)(1),
(2) Date: Feb. 13, 2023

(87) PCT Pub. No.: WO2022/080828
PCT Pub. Date: Apr. 21, 2022

(65) Prior Publication Data

US 2023/0294553 A1 Sep. 21, 2023

(30) Foreign Application Priority Data

Oct. 13, 2020 (KR) ........................ 10-2020-0131717
Sep. 30, 2021 (KR) ........................ 10-2021-0130201

(51) Int. Cl.
*B60L 58/15* (2019.01)
*B60L 53/14* (2019.01)

(52) U.S. Cl.
CPC ............... *B60L 58/15* (2019.02); *B60L 53/14* (2019.02); *B60L 2240/549* (2013.01)

(58) Field of Classification Search
CPC ................................ B60L 58/15; B60L 53/14
(Continued)

(56) References Cited

U.S. PATENT DOCUMENTS 6,825,638 B2 11/2004 Kim
12,149,114 B2 * 11/2024 Nakao .............. H02J 7/007182
(Continued)

FOREIGN PATENT DOCUMENTS

CN 101689768 A 3/2010
CN 102387932 A 3/2012
(Continued)

OTHER PUBLICATIONS

Office Action dated Mar. 14, 2025, issued in Chinese Patent Application No. 202180048425.8.
(Continued)

*Primary Examiner* — Nathaniel R Pelton
(74) *Attorney, Agent, or Firm* — Morgan, Lewis & Bockius LLP

(57) ABSTRACT

A method and a system for preventing overcharging of a battery configured to supply electric power to a driving motor of an electric vehicle and an E-PTO are disclosed. The method includes: detecting a charging state of the battery; calculating an amount of reduction in output power by calculating an average input power input to the battery in an overcharging state of the battery and calculating the amount of reduction in power to be output by a charger based on the calculated average input power; and requesting a reduction in charging power to the charger based on the calculated amount of reduction in output power.

17 Claims, 2 Drawing Sheets

(58) Field of Classification Search
USPC .................................................. 320/134, 109
See application file for complete search history.

(56) References Cited

U.S. PATENT DOCUMENTS

| | | | | |
|---|---|---|---|---|
| 2010/0078993 | A1 | 4/2010 | Ichikawa | |
| 2010/0207581 | A1 | 8/2010 | Sakaue | |
| 2012/0038326 | A1 | 2/2012 | Endo et al. | |
| 2013/0082519 | A1* | 4/2013 | Nagakura | B60L 53/14 307/9.1 |
| 2013/0257150 | A1 | 10/2013 | Kawasaki | |
| 2014/0084679 | A1* | 3/2014 | Li | B60L 50/53 307/10.1 |
| 2014/0232302 | A1 | 8/2014 | Tsushima | |
| 2016/0084917 | A1 | 3/2016 | Nam | |
| 2017/0126034 | A1 | 5/2017 | Kim | |
| 2018/0198145 | A1 | 7/2018 | Watanabe et al. | |
| 2019/0299803 | A1 | 10/2019 | Cheng et al. | |
| 2020/0101861 | A1 | 4/2020 | Ichikawa | |

FOREIGN PATENT DOCUMENTS

| | | | |
|---|---|---|---|
| CN | 103660967 | A | 3/2014 |
| EP | 2711233 | A2 | 3/2014 |
| JP | 2011-061909 | A | 3/2011 |
| JP | 4831179 | B2 | 12/2011 |
| JP | 2012-016223 | A | 1/2012 |
| JP | 2012-019678 | A | 1/2012 |
| JP | 2013-070478 | A | 4/2013 |
| JP | 2014-075966 | A | 4/2014 |
| JP | 2015-104143 | A | 6/2015 |
| JP | 2015-220952 | A | 12/2015 |
| JP | 6547764 | B2 | 7/2019 |
| KR | 10-2013-0025408 | A | 3/2013 |
| KR | 10-1382977 | B1 | 4/2014 |
| KR | 10-1490958 | B1 | 2/2015 |
| KR | 10-1610507 | B1 | 4/2016 |
| KR | 10-2018-0003654 | A | 1/2018 |
| KR | 10-2018-0073237 | A | 7/2018 |
| KR | 10-2019-0062824 | A | 6/2019 |
| TW | 201410506 | A | 3/2014 |
| TW | 201943180 | A | 11/2019 |
| WO | 2009/011269 | A1 | 1/2009 |
| WO | 2013/046250 | A1 | 4/2013 |

OTHER PUBLICATIONS

Office Action dated Jan. 14, 2025, issued in Taiwanese Patent Application No. 110137796.

Office Action issued Jan. 9, 2024 for Japanese Patent Application No. 2023-501854.

Extended European Search Report issued Dec. 8, 2023 for European Patent Application No. 21880475.5.

International Search Report (with partial translation) and Written Opinion dated Jan. 20, 2022, issued in corresponding International Patent Application No. PCT/KR2021/014040.

* cited by examiner

VEHICLE BATTERY OVERCHARGING PREVENTION SYSTEM AND METHOD

TECHNICAL FIELD

The present invention relates to a method for preventing overcharging of a vehicle battery, and more particularly, to a method for preventing overcharging of a battery used in a vehicle equipped with an E-TPO.

BACKGROUND ART

Recently, as regulations related to automobile exhaust gas have been strengthened due to environmental pollution, the demand for eco-friendly vehicles is increasing, and for this reason, research and development on electric vehicles that obtain power by driving a motor with the electric energy supplied by the battery are being actively conducted after receiving the electric energy from the outside and charging the battery.

Since a number of rechargeable batteries that may be charged and discharged are formed in one pack, and the battery must be charged from an external charger, the battery of such an electric vehicle has a large influence on the mileage of the electric vehicle according to the capacity and charging state of the battery.

In addition, electric vehicles equipped with ancillary equipment and external equipment that perform special purposes such as refrigeration equipment or lifting equipment while using electricity as power constitute an Electric Power Take Off (E-PTO) for supplying power to these auxiliary equipment and external equipment.

In the method of receiving electric energy from an external charger to the battery and the E-PTO, in the case of a system that receives the power required for the E-PTO from the charger together with the battery, if the charger and the electric vehicle are continuously connected even after the electric vehicle's battery is fully charged, the power not consumed by the E-PTO may overcharge the battery.

Therefore, in the prior art, overcharge is prevented by receiving the necessary power consumed in the E-PTO from the battery of the electric vehicle. However, this is because when the electric vehicle is parked for a long time with the battery fully charged, the battery is not fully charged at the time of departure due to the power supplied from the battery to the E-PTO, thereby causing a disadvantage that the efficiency of electric vehicle charging is lowered.

The background technology regarding the present invention is disclosed in the following patent documents.

(Patent Document 1) KR1490958 B1
(Patent Document 2) KR2019-0062824 A
(Patent Document 3) JP4831179 B2
(Patent Document 4) KR1610507 B1

DISCLOSURE OF THE INVENTION

Technical Object

An object of the present invention is to provide a control system and method for improving efficiency in a fully charged state of a battery and preventing overcharging in an electric vehicle equipped with an E-PTO.

Technical Solution

An overcharge prevention method according to an embodiment of the present invention includes: an overcharge detection step of detecting overcharge of the battery; a reduction output power calculation step of calculating an average input power input to the battery in an overcharging state of the battery, and calculating a power to be reduced and output by a charger based on the calculated average input power; a charge power reduction request step of requesting a reduction in charging power to the charger based on the calculated reduction output power; a reduction charging power output step in which the charger receiving the output power reduction request outputs the reduced charging power; an overcharge battery power consumption step in which the reduced charging power output in the reduction charging power output step is input only to the E-PTO, and an insufficient power of the E-PTO is supplied from the battery to consume an overcharged battery; and a normal power output step in which the charger outputs normal power again when power of the overcharged battery is consumed and a charging state of the battery is not an overcharging state, wherein the reduction charging power output step and the normal power output step are repeated based on a battery charging state.

The overcharge detection step includes: a charging state checking step of confirming the overcharging state of the battery; and an overcharging current input detection step of detecting and measuring an overcharging current input inputted to the battery when checking overcharging of the battery.

The reduction output power calculation step includes: an input power calculation step of calculating overcharge power using the detected overcharging current input value; an average input power calculation step of calculating an average input power using the calculated overcharge power and a detection time of the overcharging current input; and a reduction output power calculation step of calculating a reduction output power to request reduction from the charger based on the calculated average input power, wherein the reduction output power is obtained by subtracting twice the average input power from the power required by the E-PTO.

The charge power reduction request step includes an output power reduction request step of requesting the charger to reduce output power based on the amount of reduction power.

The overcharging state is 101% of the full charging state, and the non-overcharging state is set to 99% or less of the full charging state to maintain the charging state of the battery close to 100%.

In a system for preventing overcharging of an electric vehicle battery configured to supply electric power to a driving motor of the electric vehicle and an E-PTO, the electric vehicle includes: a battery configured to store electric energy supplied from a charger; a motor driven by receiving electric energy from the battery; an E-PTO configured to receive electric energy from the charger or the battery and supply power to electronic equipment that functions other than driving; and an overcharge control unit configured to control power input to the battery and the E-PTO and power output from the charger, wherein the overcharge control unit includes: a charging state detection unit configured to check a charging state of the battery; a current detection unit configured to detect an input current applied to the battery when the battery is overcharged; a power calculation unit configured to calculate an input power based on the input current, calculate an average input power using the input power and a detection time, and calculate an amount of reduction power that the charger needs to reduce charging power based on the average input power; and a power reduction request unit configured to request the calculated amount of reduction power from the charger.

The overcharge control unit is a component of a Battery Management System (BMS) designed integrally with a battery or a component of a Vehicle Control Unit (VCU).

The amount of reduction power to be reduced output calculated by the power calculation unit is calculated by subtracting twice the average input power from the power required by the E-PTO.

Advantageous Effects

According to an embodiment of the present invention, by arranging an overcharge control unit including a charging state detection unit, a current detection unit, a power calculation unit, and a power reduction request unit in the VCU, when the battery is overcharged, the electric vehicle detects the input current, calculates the average input power, and requests the charger to reduce the output power based on the calculated result. As a result, by limiting the power supplied from the external charger to the electric vehicle through the VCU, the battery in the overcharged state may temporarily receive the power required by the E-TPO from the external charger and battery. That is, the VCU controls the output power of the charger so that the battery supplies a part of the requested power required by the E-PTO when the battery is overcharged, and by consuming the power of the overcharged battery, it is possible to prevent overcharging of the battery, and it is possible to improve battery charging efficiency compared to the prior art.

MODES FOR CARRYING OUT THE INVENTION

Figure 1:
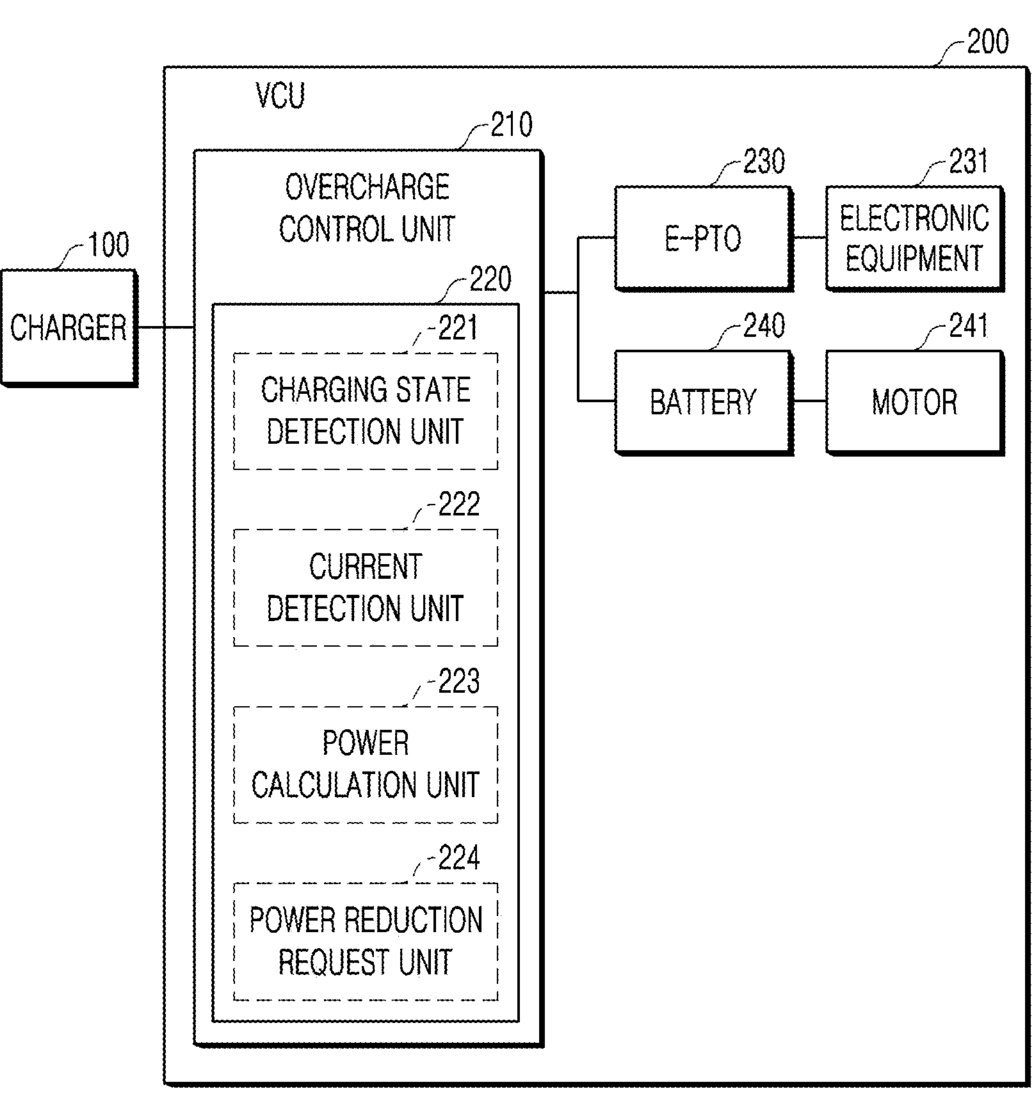
FIG. 1 is a block diagram for explaining the configuration of an entire system of the present invention according to an embodiment of the present invention.

Hereinafter, with reference to the accompanying drawings, embodiments of the present invention will be described in detail. However, the present invention is not limited to the embodiments disclosed below and will be implemented in various different forms. The embodiments of the present invention are merely provided to complete the disclosure of the present invention and to completely inform those of ordinary skill in the art the scope of the invention. In order to explain the embodiment of the present invention, the drawings may be exaggerated, parts irrelevant to the description may be omitted from the drawings, and the same reference numerals in the drawings refer to the same elements.

Hereinafter, embodiments of the present invention will be described with reference to the drawings.

Referring to FIG. 1, the present invention includes an electric vehicle 200 including a Vehicle Control Unit (VCU), an E-PTO, and a battery, and a charger 100 for supplying electric energy to the electric vehicle 200.

1. Configuration of Electric Vehicle of Present Invention

A. Battery

A battery 240 stores electric energy received from the external charger 100 and supplies the stored electric energy to the motor 241 while driving. The battery 240 of the present invention serves to supply power not only to the driving motor 241 but also to the E-PTO 230.

B. Motor

The motor 241 receives electric energy from the battery 241 and outputs the received electric energy as driving power of the electric vehicle 200.

C. E-PTO

The E-PTO 230 receives electric energy from the external charger 100 or the battery 240 and outputs the power required to drive the external electronic equipment of the electric vehicle 200.

D. Electronic Equipment

The electronic equipment 231 is mounted on the electric vehicle 200 and receives power output from the E-PTO 230 to perform functions other than driving, and for example, includes various electronic equipment 231 such as a refrigerator for a refrigeration tower vehicle, a water pump for firefighting, a driving device for opening and closing a wing body, and a lifting device for high-place work.

E. VCU

The Vehicle Control Unit (VCU) 210 controls the power between the charger 100, the battery 240, and the E-PTO 230 in the electric vehicle 200, calculates the power input for a predetermined unit time supplied to the battery 240 in the overcharging state through the overcharge control unit 220 and the input power to be reduced based on this, and transmits this to the charger 100 to request a reduction in charging power.

(1) Overcharge Control Unit

The overcharge control unit 220 is configured to include a charging state detection unit 221, a current detection unit 222, a power calculation unit 223, and a power reduction request unit 224, and may be a component of a Battery Management System (BMS) designed integrally with the battery 240 or a component of the VCU 210.

(2) Charging State Detection Unit

The charging state detection unit 221 detects the overcharging state of the battery 240 by checking the charging state of the battery 240, that is, the SOC of the battery 240 in real time. It is determined that the overcharging state of the battery 240 exceeds a predetermined SOC upper limit value, for example, 101%.

The battery 240 SOC upper limit value may be set variously according to system requirements, and for example, the SOC exceeding 100% of the battery 240 fully charged SOC may be set as the upper limit of the charging capacity. The lower limit charging capacity may be set to less than 100%.

(3) Current Detection Unit

Even when the battery 240 is in a fully charged state, that is, when the SOC measurement value of the battery 240 is greater than or equal to a predetermined reference value, for example, greater than or equal to 101%, the current detection unit 222 detects a current value input to the battery 240.

The detected input current value is a current continuously flowing into the battery 240 even though the battery 240 is above a predetermined reference SOC value, so it is determined as an overcharging current, and input current values for a predetermined time period are detected in order to calculate the input overcharge power amount, and at this time, the voltage applied to the battery 240 is measured together and transmitted to the power calculation unit 223.

(4) Power Calculation Unit

The power calculation unit 223 calculates the average input power, that is, the amount of overcharge power, for a predetermined time period detected by using the overcharge input current input to the battery 240 in the overcharging state and the voltage at this time. Also, the reduction power to request reduction from the charger 100 is calculated based on the calculated average input power.

At this time, even though the SOC of the battery 240 is, for example, 101% or more, the battery 240 is in an overcharging state due to excessive power input for the predetermined time period, in order to return this to a normal state, overcharge power of the battery 240 must be consumed. In the present invention, the power output from the charger 100 is distributed and supplied to the E-PTO 230 and the battery 240, and as a method for consuming the power of the battery 240, the E-PTO 230 requests the charger to output a power smaller than the required power by requesting a reduction in the charging power output from the charger 100. As a result, all of the reduced charging power output smaller than the required power of the E-PTO 230 is supplied to the E-PTO 230, and in addition, the power insufficient in the required power of the E-PTO 230 required by the E-PTO 230 is inputted from the battery 240 to the E-PTO 230 and supplied, so that the battery 240 in the overcharging state consumes power.

On the other hand, the reduction output power requested by the charger 100 may be calculated by subtracting a greater power from the required power of the E-PTO 230 as the reduction output power, not just the overcharge power that is the average input power input to the overcharge battery 240. For example, the reduction charging power that requests output from the charger may be calculated as power obtained by subtracting twice the average input power (overcharge power) of the overcharging state battery 240 from the required power of the E-PTO 230. Depending on the system requirements, it is possible to request to reduce the power obtained by subtracting a multiple of 1 or more instead of 2.

(5) Power Reduction Request Unit

The power reduction request unit 224 transmits to the charger 100 the power that the calculated reduction output power is reduced to output the reduction charging power. In addition, when the SOC of the battery 240 detected by the charging state detection unit 221 is detected to be less than or equal to a predetermined value, for example, 99%, the reduction output request is stopped and a normal charging is requested.

F. Charger

The charger 100 is connected to the electric vehicle 200 and receives and outputs a reduction output or a normal output request according to the SOC state of the battery 240 detected by the overcharge control unit 220 of the VCU 210. For example, when the SOC is 101% or more, the reduction charging power that reduces the calculated reduction output power is output to prevent overcharging, and at 99% or less, normal power is output, and the battery 240 SOC may be maintained close to 100%.

Figure 2:
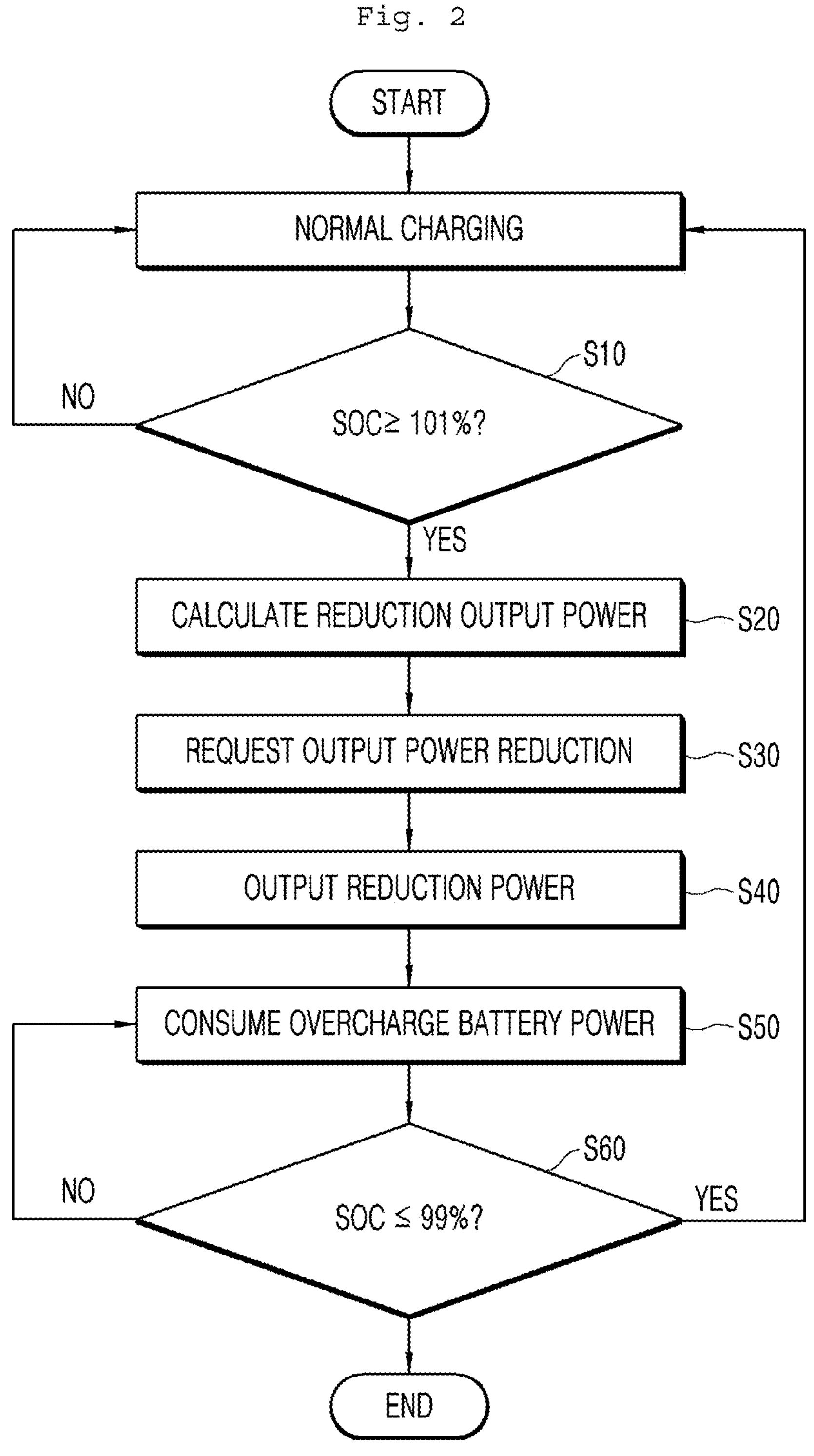
FIG. 2 is a flowchart schematically illustrating a method for preventing overcharging of a battery according to an embodiment of the present invention.

2. Method for Preventing Battery Overcharging of Electric Vehicle according to Present Invention FIG. 2 is a flowchart illustrating a method for preventing overcharging of the battery 240 of the electric vehicle 200 according to an embodiment of the present invention.

Each procedure is described as follows.

A. Overcharge Detection Step S10

First, the battery 240 is charged by connecting the charger 100 and the electric vehicle 200.

The overcharge detection step is a procedure for detecting a state in which the battery is overcharged and continuously detecting a charging current flowing into the battery in the overcharging state.

This may be configured including an overcharging state checking step and an overcharging current input detection step.

(1) Overcharging State Checking Step

During charging, the current detection unit 222 of the overcharge control unit 220 checks the charging state of the battery 240, that is, the SOC of the battery 240 in real time to confirm the charging state.

As a result of checking the charging state, if the SOC is greater than a predetermined SOC upper limit value, for example, 101% or more, it is determined as an overcharging state.

(2) Overcharging Current Input Detection Step

The overcharging current input detection step is a step of detecting and measuring an overcharging current input in which a charging current is continuously input to the battery even in an overcharging state as a result of checking in the overcharging state checking step.

When the SOC of the battery 240 exceeds a predetermined upper limit value, for example, 101% or more, the current detection unit 222 detects the current input to the battery 240 at this time. Since the detected input current value is a current continuously flowing into the battery 240 even though the battery 240 is above a predetermined reference SOC, it is determined as an overcharging current, and in order to calculate the input amount of overcharge power, the input current values are detected for a predetermined time period and at this time, the voltage applied to the battery 240 is measured together and transmitted to the power calculation unit 223.

The battery 240 SOC upper limit value may be set variously according to system requirements, and for example, the SOC exceeding 100 of the battery 240 fully charged SOC may be set as the upper limit charging capacity. The lower limit charging capacity may be set to less than 100%.

B. Reduction Output Power Calculation Step S20

Using the measured overcharge input current and the voltage at this time, the average input power during the detected predetermined time period, that is, the amount of overcharge power is calculated. Also, based on the calculated average input power, a reduction output power (power cutoff amount) to request a reduction from the charger 100 is calculated.

At this time, since the battery 240 is in an overcharging state due to excessive power input for the predetermined time period even through the SOC of the battery 240 is 100%, in order to return this to a normal state, the overcharge power of the battery 240 must be consumed. The power output from the charger 100 is distributed and supplied to the E-PTO 230 and the battery 240, and as a method for consuming power of the battery 240, the power output from the charger 100 is output with a power smaller than the power required by the E-PTO 230. As a result, the power output from the charger 100 is distributed and supplied to the E-PTO 230 and the battery 240, and as a method for consuming power of the battery 240, the power output from the charger 100 is output with a power smaller than the power required by the E-PTO 230.

Therefore, the reduced charging power requested by the charger 100 is calculated by subtracting the larger power from the reduction output power, not just the average input power of the overcharge battery 240 under the E-PTO 230 requirement. For example, the reduction charging power requested by the charger may be calculated by subtracting twice the average input power of the battery 240 from the required power of the E-PTO 230. Depending on the system requirements, it may be possible to request a reduction in multiples of 1 or more instead of 2 or more.

C. Charge Power Reduction Request Step S30

The power reduction request unit 224 requests the charger 100 to output the reduction charging power obtained by reducing the calculated reduction output power from the required power of the E-PTO 230. In addition, when the SOC of the battery 240 detected by the charging state detection unit 221 is detected as a predetermined lower limit value, for example, 99% or less, it is possible to stop requesting charging power reduction and request normal charging.

D. Reduction Charging Power Output Step S40

The charger 100 outputs the reduction charging power requested by the power reduction request unit 224. In addition, when the SOC of the battery 240 detected by the charging state detection unit 221 is detected as a predetermined lower limit value, for example, 99% or less, it is possible to output the normal power by interrupting the reduction output request.

E. Overcharge Battery Power Consumption Step S50

The reduction power input from the charger 100 receiving the reduction output request to the electric vehicle 200 is input only to the E-PTO 230 by the power required by the E-PTO 230. Therefore, since the battery 240 is no longer overcharged and the charger 100 does not transmit all of the power required by the E-PTO 230, the E-PTO 230 is supplied with insufficient power from the battery 240, and due to this, the overcharged battery consumes power to be out of the overcharging state.

F. Normal Power Charging Step S60

If the reduction charging power output step continues in the overcharging state of the battery 240, the SOC is reduced due to power consumption of the battery 240, and when the SOC of the battery 240 is confirmed as a predetermined lower limit value, for example, 99% or less, normal charging is performed by stopping the charge power reduction request transmitted from the VCU 210 to the charger 100.

The system and charging method of the present invention periodically repeat the above process according to the charging state of the battery 240. As a result, the battery 240 may prevent overcharging by maintaining the SOC state of a predetermined lower limit value or upper limit value, for example, 99% to 101%, and it will be kept close to the full charging state.

The above embodiments of the present invention are intended to illustrate the present invention, not to limit the present invention. It should be noted that the configurations and methods disclosed in the above embodiments of the present invention may be combined and modified in various forms by combining or intersecting with each other, and modifications thereof may also be considered within the scope of the present invention. That is, the present invention will be implemented in a variety of different forms within the scope of the claims and equivalent technical spirit, and those skilled in the art to which the present invention pertains will understand that various embodiments are possible within the scope of the technical spirit of the present invention.

Description of Reference Numerals in the drawings of the present invention is given below.

100: charger
200: electric vehicle
210: VCU
220: overcharge control unit
221: charging state detection unit
222: current detection unit
223: power calculation unit
224: power reduction request unit
230: Electric Power Take Off
231: electronic equipment
240: battery
241: motor

The invention claimed is:

1. A method of preventing overcharging of a battery configured to supply electric power to a driving motor of an electric vehicle and to an electric power take off (E-PTO), the method comprising:

detecting a charging state of the battery;

calculating an amount of reduction in output power by calculating an average input power input to the battery in an overcharging state and calculating the amount of reduction in power to be output by a charger based on the calculated average input power; and requesting a reduction in charging power to the charger based on the calculated amount of reduction in output power, wherein the requesting of the reduction in charging power includes requesting the charger to output a reduced charging power obtained by subtracting the calculated amount of reduction in output power from a power required by the E-PTO.

2. The method of claim 1, further comprising:

receiving the charging power reduction request and outputting the reduced charging power;

inputting the reduced charging power from the charger only to the E-PTO, and supplying power to the E-PTO from the battery in the overcharging state to make up for a shortfall in power supplied to the E-PTO from the charger to consume power from the battery in the overcharging state; and outputting a normal charging power again if power from the battery in the overcharging state is consumed and the battery is not in the overcharging state, wherein the outputting of the reduced charging power and the outputting of the normal charging power are repeated based on the detected charging state of the battery.

3. The method of claim 1, wherein the detecting of the charging state of the battery comprises:

detecting whether the battery is in the overcharging state; and detecting and measuring an overcharging current input to the battery if the battery is detected to be in the overcharging state.

4. The method of claim 3, wherein the calculating of the amount of reduction in output power comprises:

calculating an overcharge power based on the detected overcharging current input;

calculating the average input power based on the calculated overcharge power and a detection time of the overcharging current input; and calculating the amount of reduction in output power to request from the charger based on the calculated average input power, wherein the amount of reduction in output power is greater than the average input power.

5. The method of claim 1, wherein:

the overcharging state of the battery is greater than or equal to 101% of a full charging state of the battery, and a non-overcharging state of the battery is set to 99% or less of the full charging state to maintain the charging state of the battery close to 100%.

6. The method of claim 1, wherein the E-PTO is configured to receive power from the charger and from the battery and to supply power to electronic equipment of the electric vehicle related to operations other than driving.

7. The method of claim 1, further comprising:

with the battery in the overcharging state, inputting the reduced charging power from the charger only to the E-PTO, and supplying power to the E-PTO from the battery in the overcharging state to make up for a shortfall in power supplied to the E-PTO from the charger to consume power from the battery in the overcharging state.

8. A system for preventing overcharging of a battery configured to supply electric power to a driving motor of an electric vehicle and to an electric power take off (E-PTO), the system comprising:

an overcharge controller configured to control power input to the battery and the E-PTO and power output from a charger, wherein the overcharge controller comprises:

a charging state detection circuit configured to check a charging state of the battery;

a current detection circuit configured to detect an input current applied to the battery with the battery in an overcharged state;

a power calculation circuit configured to calculate an input power based on the input current, to calculate an average input power based on the input power and a detection time, and to calculate an amount of reduction in power for the charger to reduce from a charging power based on the average input power; and a power reduction request circuit configured to request the charger to output a reduced charging power obtained by subtracting the calculated amount of reduction in power from a power required by the E-PTO.

9. The system of claim 8, wherein the overcharge controller is a component of a Battery Management System (BMS) designed integrally with the battery or a component of a Vehicle Control Unit (VCU).

10. The system of claim 8, wherein the amount of reduction in power calculated by the power calculation circuit is greater than the average input power.

11. An electric vehicle comprising the system of claim 8.

12. The electric vehicle of claim 11, further comprising:

the battery configured to store electric energy supplied from the charger;

the driving motor configured to be driven by the electric energy from the battery; and the E-PTO configured to receive the electric energy from the charger or the battery and to supply power to electronic equipment of the electric vehicle related to operations other than driving.

13. The system of claim 8, wherein, with the battery detected to be in the overcharging state, the overcharge controller is further configured to:

input the reduced charging power from the charger only to the E-PTO; and supply power to the E-PTO from the battery in the overcharging state to make up for a shortfall in power supplied to the E-PTO from the charger to consume power from the battery in the overcharging state.

14. The system of claim 13, wherein the overcharge controller is further configured to:

receive the reduced charging power from the charger if the battery is detected to be in the overcharging state; and receive a normal charging power from the charger again if the battery is no longer in the overcharging state.

15. The system of claim 8, wherein charging state detection circuit is further configured to detect whether the battery is in the overcharging state or a non-overcharging state.

16. The system of claim 15, wherein:

the overcharging state of the battery is greater than or equal to 101% of a full charging state of the battery; and the non-overcharging state of the battery is less than or equal to 99% of the full charging state of the battery.

17. The system of claim 8, wherein the amount of reduction in output power is greater than the average input power.

* * * * *